United States Patent Office 3,374,270
Patented Mar. 19, 1968

3,374,270
PROCESS AND CATALYST FOR CATALYTIC DEHYDROGENATION OF CYCLODODECANOL
Manfred zur Hausen and Wilhelm Knepper, Marl, Germany, assignors to Chemische Werke Huls Aktiengesellschaft, Marl, Germany, a corporation of Germany
No Drawing. Filed June 2, 1965, Ser. No. 460,815
Claims priority, application Germany, June 4, 1964, C 33,046
8 Claims. (Cl. 260—586)

This invention relates to the improvement of the process for catalytic dehydrogenation of cyclododecanol and the catalyst used therein.

It is an object of the present invention to improve the process of dehydrogenation of cyclododecanol.

Another object of the invention is to provide a method of making an improved catalyst for the dehydrogenation of cyclododecanol.

According to the prior art cyclododecanol is catalytically converted into cyclododecanone by gas phase dehydrogenation. In this process it is advantageous to use catalysts which contain large amounts of zinc oxide. The use of such catalysts requires reaction temperatures of 400 to 500° C. Such a process has the serious disadvantage that besides the cost of the apparatus, there is also the expense of maintaining a reaction temperature of 400 to 500° C. and vaporizing the cyclododecanol.

It is also old to dehydrogenate alcohols in the liquid phase to the corresponding ketones. For example, isoborneol in the presence of powdered nickel, cobalt or copper catalysts can be dehydrogenated to camphor as disclosed by German Patent No. 271,147. The use of finely divided catalyst necessitates a subsequent filtration of the resulting product during which it is difficult to remove all the finely divided nickel particles from the ketone. The nickel and cobalt catalysts preferred for the latter process are not suitable for the dehydrogenation of cyclododecanol.

In another known process, in an effort to avoid the necessity of filtering off the catalyst residues, the work is done over a solid bed copper-barium-chromite catalyst. Such a catalyst is also not suitable for the dehydrogenation of cyclododecanol because an efficient dehydrogenation of that substance would generally require a temperature above 250° C. which would render the process uneconomical. For the application of such a process to alcohols which like cyclododecanol boil above 250° C. (cyclododecanol boils at 271° C.), the work has been done in the presence of a solvent and under diminished pressure. Such a process however requires the additional expense of removing the solvent and maintaining the diminished pressure as disclosed in German specification I 3,631.

For the dehydrogenation of alcohols use has been made of carrier catalysts containing kieselguhr, copper and alkali compounds in certain proportions wherein the copper is partly substituted by nickel as disclosed in German Patent 1,147,933. It has been found however that carrier substances with a silicic acid base are not suitable for the dehydrogenation of cyclododecanol.

According to the present invention it has been found that cyclododecanol can be catalytically dehydrogenated in a simpler manner into good yields of cyclododecanone by heating cyclododecanol in the liquid phase to 160–230° C. in the presence of a solid bed catalyst composed of 5–15% by weight of copper on activated aluminum oxide.

A new and unexpected result of the present invention is a low olefin formation. Contrary to expectations such catalysts do not show the usual tendency of aluminum oxide to cause olefin formation. The aluminum oxide used should have a surface area of 30 to 100 m.$^2$/g., preferably 50 to 75 m.$^2$/g. with a pore volume of more than 0.30 ml./g., preferably 0.45 to 0.55 ml./g Such an aluminum oxide suitable for the dehydrogenation of cyclododecanol is obtained by treating activated aluminum oxide 8 to 10 hours with steam at 700 to 850° C., preferably at about 780° C. The activated aluminum oxide steam treated has a pore volume of about 0.45 to 0.55 ml./g. and a surface area of 150 to 450 m.$^2$/g. By this treatment the surface area of the active aluminum oxide is reduced as required without any change of its original high and desired pore volume. An aluminum oxide that has been prepared in this manner is suitable because of its high pore volume and active surface to absorb and finely disperse in adequate amount the copper with which it has been impregnated.

As a metallic component copper is applied to the aluminum oxide as solutions which contain the copper in the form of easily decomposable salts. Suitable copper salts are copper nitrate, copper tetramine formate, copper acetate, copper carbonate, copper tetramino oxalate, and the corresponding copper complex compounds where instead of ammonia, ethylene-diamine or ethanolamine is used. The deposited copper should amount to at least 5% by weight of the catalyst. Especially suitable are catalysts with 5 to 15% and preferably 9 to 12% copper. The catalyst should not contain more than 15% copper because larger amounts of copper will tend to flake off and collect in the reaction product as an impurity.

Especially suitable are those catalysts in which the copper is reacted with alkali compounds such as sodium or potassium compounds in which the alkali, calculated as $Na_2O$ or $K_2O$, amounts to 0.25 to 1.5% by weight of the catalyst. Suitable alkali compounds used for this purpose are salts such as potassium permanganate, sodium formate, but especially the hydroxides of potassium and sodium and the hydroxides of rubidium and caesium. The alkaline earth hydroxides of strontium and barium are also suitable. The compounds mentioned are introduced in the form of aqueous solutions. The catalysts thus produced contain 5 to 15% by weight, preferably 9 to 12% copper and 0 to 1.5%, preferably 0.5 to 0.8% $K_2O$ or $Na_2O$, 95 to 84%, preferably 92 to 87%, activated aluminum oxide, produced as described above.

The catalysts are produced as follows: the aluminum oxide which has been treated with steam is impregnated under vacuum with an aqueous solution of a copper salt. The excess of solution is then drawn off and the impregnated aluminum oxide then dried several hours at about 130° C. The dried catalyst is placed in the reactor where it is reduced at 200° C. in a current of hydrogen. To produce catalysts which contain alkali compounds, the aluminum oxide is first impregnated under vacuum with a water solution of the alkali compound. After the excess of alkali solution is drawn off, the aluminum oxide is dried several hours at 200° C. and is then impregnated in the described manner with the copper solution and further treated in the manner described.

The catalysts are used in the form of solid beds. The conversion of the cyclododecanol is effected at temperatures between 160 and 230° C., especially between 200 and 220° C. The amount of catalyst is 0.5 to 1.5 liters, preferably 1 liter cyclododecanol per liter catalyst per hour.

The dehydrogenation can be performed in a spraying oven, preferably in an oil heated sump oven. The escaping hydrogen is of exceptional purity. The liquid which leaves the reactor is fractionated in an adjacent column under diminished pressure and at reactor temperatures so that after distillation has been started hardly any additional heating energy will be needed. The escaping pure hydrogen can be used for other reactions without further treatment. The cyclododecanol which appears during the fractionation is returned to the reactor.

An advantage of this process is that it can be performed at relatively low temperatures in the liquid phase so that it will not be necessary to spend large amounts of energy on the vaporization of the cyclododecanol. The process results in a high percentage of conversion, while the production of olefins and other by-products is practically avoided.

The results set forth in the following table are those obtained by the use of known copper and nickel catalysts (3 to 7) in comparison with those obtained with the copper catalysts of this invention (1 and 2). The results were obtained by separate experiments with the same amounts of catalysts and cyclododecanol.

TABLE

| Experiment No. | Catalyst | Reaction conditions | | Yield content, percent | |
|---|---|---|---|---|---|
| | | Temperature, °C. | Time, hours | Cyclododecanone | Pre-run +olefin |
| PRESENT INVENTION | | | | | |
| 1 | 9.5% Cu on activated alumina | 210 | 1 | 82.1 | 0.2 |
| 2 | 9.1% Cu, 0.8% K$_2$O on activated alumina. | 210 | 1 | 85.0 | 0.05 |
| PRIOR ART | | | | | |
| 3 | 9.1% Ni on activated alumina | 210 | 1 | 89.0 | 2.8 |
| 4 | 20% Cu on silica gel | 210 | 1 | 80.0 | 1.5 |
| 5 | 15% Ni, 5% Cu on silica gel | 200 | 1 | 73.1 | 2.6 |
| 6 | 15% Cu, 2% Cr on Stuttgarter Masse (silicate containing small amounts of sodium, iron, calcium and magnesium oxides). | The metal is rubbed off the carrier | | | |
| 7 | 5% Cu on pumice | | | | |

Without further elaboration, it is believed that one skilled in the art can, using the preceding description, utilize the present invention to its fullest extent. The following preferred specific embodiments are, therefore, to be construed as merely illustrative and not limitative of the remainder of the specification and claims in any way whatsoever.

Example 1

1000 g. aluminum oxide which has been treated by a current of steam at about 780° C. and which has a pore volume of 0.52 ml./g. and a surface area of 70 m.$^2$/g. are impregnated with 1200 cm.$^3$ of an aqueous solution of copper tetramine carbonate which at a specific gravity of 1.32 contains about 15% by weight of copper. After standing 30 minutes, the excess of solution is drawn off and the catalyst is dried 10 hours at 130° C. the dried catalyst with 9.2% by weight of copper is heated to 200° C. in a current of hydrogen whereby highly activated copper is formed.

250 ml. of the catalyst thus produced are filled into an oil-heated reaction vessel in the form of a sump oven. Into the bottom of this oven 250 ml. cyclododecanol are introduced per hour while from the top the reaction product with the liberated hydrogen is continually drawn off. With a reaction temperature of 200° C. the resulting reaction mixture contains 78% by weight cyclododecanone, 0.2% preliminary product and 21.8% cyclododecanol.

In a further experiment 670 kg. cyclododecanol is passed during 40 hours at 204 to 209° C. over 16.5 kg. of the same catalyst in 18.7 liters. The conversion amounts to about 75% on the average, and the yield is about 98% of what is converted.

Example 2

1000 g. of a similarly treated aluminum oxide with a pore volume of 0.51 ml./g. and a surface area of about 70 m.$^2$/g. are impregnated under vacuum with 1000 ml. of an aqueous potassium hydroxide solution containing 18.2 g. K$_2$O. After removal of the excess, the aluminum oxide retains 510 ml. of the solution with 9.1 g. K$_2$O. The impregnated aluminum oxide is then dried 10 hours at 200° C. and is then impregnated with a copper tetramine carbonate solution and further treated as in Example 1. The catalyst contains 9.1% Cu and 0.82% K$_2$O.

250 ml. of the catalyst thus produced are filled into an oil heated sump oven as in Example 1 and 200 ml. cyclododecanol added to it per hour. With a reaction temperature of 215° C. the reaction mixture after 170 hours has the following composition: 0.1% by weight of preliminary product, 74% cyclododecanone and 25.9% cyclododecanol.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be within the full range of equivalence of the following claims.

What is claimed is:

1. In a process for the catalytic dehydrogenation of cyclododecanol to cyclododecanone, the improvement comprising heating cyclododecanol in the liquid phase between 160 and 230° C. in the presence of a solid bed catalyst, said solid bed catalyst comprising 5 to 15% by weight of copper on an activated aluminum oxide carrier, said carrier having a surface area of 30–100 square meters per gram and a pore volume of more than 0.30 ml. per gram.

2. In a process for the catalytic dehydrogenation of cyclododecanol to cyclododecanone, the improvement comprising heating liquid phase cyclododecanol between 160 and 230° C. in the presence of a solid bed catalyst, said solid bed catalyst comprising 5 to 15% by weight of copper on an activated aluminum oxide carrier, said carrier having a surface area of 30 square meters per gram to 100 square meters per gram, a pore volume of 0.30 ml. per gram of 0.55 ml. per gram, said carrier calcined at 700 to 850° C. in a current of steam.

3. In a process for the catalytic dehydrogenation of cyclododecanol to cyclododecanone, the improvement comprising heating cyclododecanol in the liquid phase between 160 and 230° C. in the presence of a solid bed catalyst, said solid bed catalyst comprising 5 to 15% by weight of copper and 0.25 to 1.5% by weight of alkali salt calculated as KO and Na$_2$O on an activated aluminum oxide carrier, said carrier having a surface area of 30–100 square meters per gram and a pore volume of more than 0.30 ml. per gram.

4. In a process for the catalytic dehydrogenation of cyclododecanol to cyclododecanone, the improvement comprising heating liquid phase cyclododecanol between 160 and 230° C. in the presence of a solid bed catalyst, said solid bed catalyst comprising 5 to 15% by weight of copper and 0.25 to 1.5% by weight of alkali salt calculated as $K_2O$ and $Na_2O$ on an activated aluminum oxide carrier, said carrier having a surface area of 30 square meters per gram to 100 square meters per gram, a pore volume of 0.30 ml. per gram to 0.55 ml. per gram, said carrier calcined at 700 to 850° C. in a current of steam.

5. In a process for the catalytic dehydrogenation of cyclododecanol to cyclododecanone, the improvement comprising heating cyclododecanol in the liquid phase between 160 and 230° C. in the presence of a catalyst, said catalyst comprising 5 to 15% by weight of copper on an activated aluminum oxide carrier, said carrier having a surface area of 30–100 square meters per gram and a pore volume of more than 0.30 ml. per gram.

6. In a process for the catalytic dehydrogenation of cyclododecanol to cyclododecanone, the improvement comprising heating liquid phase cyclododecanol between 160 and 230° C. in the presence of a catalyst, said catalyst comprising 5 to 15% by weight of copper on an activated aluminum oxide carrier, said carrier having a surface area of 30 square meters per gram to 100 square meters per gram, a pore volume of 0.30 ml. per gram to 0.55 ml. per gram, said carrier calcined at 700 to 850° C. in a current of steam.

7. In a process for the catalytic dehydrogenation of cyclododecanol to cyclododecanone, the improvement comprising heating cyclododecanol in the liquid phase between 160 and 230° C. in the presence of a catalyst, said catalyst comprising 5 to 15% by weight of copper and 0.25 to 1.5% by weight of alkali salt calculated as $K_2O$ and $Na_2O$ on an activated aluminum oxide carrier, said carrier having a surface area of 30–100 square meters per gram and a pore volume of more than 0.30 ml. per gram.

8. In a process for the catalytic dehydrogenation of cyclododecanol to cyclododecanone, the improvement comprising heating liquid phase cyclododecanol between 160 and 230° C. in the presence of a catalyst, said catalyst comprising 5 to 15% by weight of copper and 0.25 to 1.5% by weight of alkali salt calculated as $K_2O$ and $Na_2O$ on an activated aluminum oxide carrier, said carrier having a surface area of 30 square meters per gram to 100 square meters per gram, a pore volume of 0.30 ml. per gram to 0.55 ml. per gram, said carrier calcined at 700 to 850° C. in a current of steam.

References Cited

UNITED STATES PATENTS 2,725,400　1/1955　Mecorney et al. ___ 260—596 X

FOREIGN PATENTS 1,103,326　3/1961　Germany.

LEON ZITVER, *Primary Examiner.*

M. JACOB, *Assistant Examiner.*